(12) United States Patent
Muller et al.

(10) Patent No.: US 11,598,488 B2
(45) Date of Patent: Mar. 7, 2023

(54) LEAK-PROOF FLUID DISPENSING SYSTEM WITH PRESSURE SENSOR AND ADJUSTABLE DISPENSING REGULATOR, DISPENSING CONTROL VALVE STRUCTURE WITH PRESSURE SENSOR, AND DISPENSING CONTROL VALVE STRUCTURE

(71) Applicant: ION ELECTRONIC MATERIALS CO., LTD., Hsinchu County (TW)

(72) Inventors: Stuart-James Muller, Hsinchu County (TW); Jiun-Liang Chen, Hsinchu County (TW)

(73) Assignee: ION ELECTRONIC MATERIALS CO., LTD., Hsinchu County (TW)

( * ) Notice: Subject to any disclaimer, the term of this patent is extended or adjusted under 35 U.S.C. 154(b) by 0 days.

(21) Appl. No.: 16/832,432

(22) Filed: Mar. 27, 2020

(65) Prior Publication Data
US 2020/0309326 A1 Oct. 1, 2020

Related U.S. Application Data

(60) Provisional application No. 62/826,766, filed on Mar. 29, 2019.

(51) Int. Cl.
*F17C 13/02* (2006.01)
*F17C 13/04* (2006.01)
*F16K 1/30* (2006.01)

(52) U.S. Cl.
CPC .............. *F17C 13/04* (2013.01); *F16K 1/304* (2013.01); *F17C 13/025* (2013.01); *F17C 2205/0338* (2013.01); *F17C 2205/0382* (2013.01); *F17C 2205/0388* (2013.01)

(58) Field of Classification Search
CPC ................ F17C 13/024; F17C 13/04; F17C 2205/0338; F17C 2205/0382; F17C 2205/0388
See application file for complete search history.

(56) References Cited

U.S. PATENT DOCUMENTS 7,013,916 B1 * 3/2006 Pearlstein ........... F16K 37/0091
137/613
8,327,865 B2 * 12/2012 Stenmark .................. F17C 1/00
137/15.18

* cited by examiner

*Primary Examiner* — Paul J Gray

(57) ABSTRACT

The present invention provides a leak-proof fluid dispensing system with a pressure sensor and an adjustable dispensing regulator, comprising: a gas cylinder and a pressure dispensing control valve. The dispensing control valve is formed outside the bottle body opening and has an internal channel that communicates with an inlet port, an outlet port, a bottle port, and the joint portion. The internal of the dispensing body includes an inlet valve, an outlet valve, a pressure dispensing regulator, a filter, and a pressure sensor. The pressure at the outlet end of pressure dispensing regulator is lower than or equal to a preset opening pressure value, the fluid is allowed to flow out. With the implementation of the present invention, it may prevent accidental leakage of fluid in the gas cylinder and dynamically monitor the flow gas capacity in the gas cylinder.

3 Claims, 5 Drawing Sheets

LEAK-PROOF FLUID DISPENSING SYSTEM WITH PRESSURE SENSOR AND ADJUSTABLE DISPENSING REGULATOR, DISPENSING CONTROL VALVE STRUCTURE WITH PRESSURE SENSOR, AND DISPENSING CONTROL VALVE STRUCTURE

BACKGROUND OF THE INVENTION

1. Technical Field

The present invention relates to a leak-proof fluid dispensing system with pressure sensor and adjustable dispensing regulator, dispensing control valve structure with pressure sensor, and dispensing control valve structure, it is particularly designed for the storage and distribution for the toxic industrial gas such as compressed gas or liquefaction compression by using a storage container and a distributor.

2. Description of Related Art

In various industrial processes and applications, reliable hazardous and non-hazardous processing fluids are often required. For example, in semiconductor manufacturing, ion implantation, manufacturing of flat panel displays, medical interventions and treatment, water treatment, emergency breathing equipment, welding operations, liquid and gas transportation in space bases, etc., all need safe, reliable and efficient processing fluids to supply continuously to complete the relevant production or operation.

Toxic gases and other harmful special gases are often used in many industrial processing, including the manufacture of semiconductor components, because these gases can cause huge harm to humans, animals or the environment so that users of these harmful special gases will worry about the possibility of gas release by accident.

Standard compressed gas cylinder contains super-atmospheric pressure gas. Once the user end is connected to a pressurized gas cylinder and the outlet valve is opened, then the gas in the gas cylinder will be immediately released, even if the user installs the leak-proof outlet cover to meet the requirements for using dangerous gases. However, if the valve is accidentally opened in a closed plant when the outlet cover is removed, then it will cause serious casualties.

Although such incidents are not expected to happen, accidental leakages of harmful gases may still occur in semiconductor processing applications. Once such leakage events occur, some or all of the people must be immediately evacuated from semiconductor processing factory, which will lead to suddenly unplanned shutdown of the production line and a large number of scraps of products and other losses. Moreover, sensitive and expensive equipment used in semiconductor processing plants may also be damaged by exposure to harmful gases.

In order to avoid the occurrence of the above-mentioned harmful gas leakage events, many semiconductor manufacturing processes, such as ion implantation, chemical vapor deposition, reactive ion etching, high-density plasma etching, etc., use harmful sub-atmospheric pressure gas supply system all the time. In such a system, a dispensing regulator is usually installed inside of a gas cylinder, and the pressure output from the gas cylinder is set lower than a preset pressure which is under an atmospheric pressure, thereby avoiding the problem of gas leakage.

However, in the conventional gas supply systems, the valve components are installed inside of gas cylinders, not only the space for gas cylinders will be accommodated, but also causes difficulty for its setting, maintaining, or repairing. The problem is when the gas cylinder is used to store some special gas or liquid, the valve components may also be damaged due to long-term immersion in the special gas or liquid. Furthermore, when the above-mentioned gas cylinder is applied to a production line, once the gas in the cylinder is run out without warning, then the gas supply will be interrupted. At this time, the production line will be forced to stop and must wait until a new gas cylinder set again before the production line can resume operation. This will cause the risk of equipment damage and production line shutdown will also cause loss of production capacity. Therefore, how to dynamically watching the gas volume in gas cylinder is also a problem which needs to overcome at present.

In addition, because the dispensing control valve of gas cylinder is generally known of it spoor safety, then an adsorption material is set in the gas cylinder to increase the stability of the contents in the gas cylinder. Thus, it not only increases costs, also causes a significant reduction in the storage capacity of the gas cylinder.

SUMMARY OF THE INVENTION

The present invention provides a leak-proof fluid dispensing system with pressure sensor and adjustable dispensing regulator, dispensing control valve structure with pressure sensor, and dispensing control valve structure. It mainly solves the problem of the dispensing control valve installed inside of a gas cylinder that not only greatly occupies the storage space of the gas cylinder, but also makes operate and maintain difficultly. In addition, the other problem is the conventional gas cylinder does not have a pressure sensor and cannot dynamically monitor the gas volume in the gas cylinder.

The present invention provides a leak-proof fluid dispensing system with pressure sensor and adjustable dispensing regulator, comprising: a gas cylinder having a containing space and a bottle opening; and a dispensing control valve including: a dispensing body having an internal channel that communicates with an inlet port, an outlet port, a bottle port, and a joint portion which is detachably and can be sealed combined to the bottle opening, so that the bottle port is detachably communicated with the containing space, and the dispensing body is formed outside the bottle opening, wherein the internal of the dispensing body including: an inlet valve connected to the inlet port and the internal channel; an outlet valve connected to the outlet port and the internal channel; a pressure dispensing regulator connected to the outlet port and the bottle port through the internal channel and preset with an opening pressure value, when the actual pressure at the outlet end of the pressure dispensing regulator is lower than or equal to the opening pressure value, then the pressure dispensing regulator is being opened; a filter connected to the pressure dispensing regulator and the bottle port through the internal channel; and a pressure sensor disposed on the dispensing body and having a detection end, and the detection end pressure-sensitively connected to the internal channel between the filter and the bottle port.

The present invention further provides a dispensing control valve structure with pressure sensor, including: a dispensing body having an internal channel that communicates with an inlet port, an outlet port, a bottle port, and a joint portion which is detachably and can be sealed combined to the bottle opening, wherein the join portion is detachably connected to the bottle opening so that the bottle port is detachably communicated with the containing space, and the dispensing body is formed outside the bottle opening, wherein the internal of the dispensing body including: an inlet valve connected to the inlet port and the internal channel; an outlet valve connected to the outlet port and the internal channel; a pressure dispensing regulator connected to the outlet port and the bottle port through the internal channel and preset with an opening pressure value, when the actual pressure at the outlet end of the pressure dispensing regulator is lower than or equal to the opening pressure value, then the pressure dispensing regulator is being opened; a filter connected to the pressure dispensing regulator and the bottle port through the internal channel; and a pressure sensor disposed on the dispensing body and having a detection end, and the detection end connected to the internal channel between the filter and the bottle port.

The present invention further provides a dispensing control valve structure, including: a dispensing body having an internal channel that communicates with an inlet port, an outlet port, a bottle port, and a joint portion which is detachably and can be sealed combined to the bottle opening, wherein the join portion is detachably connected to the bottle opening so that the bottle port is detachably communicated with the containing space, and the dispensing body is formed outside the bottle opening, wherein the internal of the dispensing body including: an inlet valve connected to the inlet port and the internal channel; an outlet valve connected to the outlet port and the internal channel; a pressure dispensing regulator connected to the outlet port and the bottle port through the internal channel and preset with an opening pressure value, when the actual pressure at the outlet end of the pressure dispensing regulator is lower than or equal to the opening pressure value, then the pressure dispensing regulator is being opened; and a filter connected to the pressure dispensing regulator and the bottle port through the internal channel.

Implementation of the present invention at least produces the following advantageous effects:

1. It can reduce the possibility of accidental leakage or release of toxic liquids or gases.
2. It can eliminate the need for a regulator inside a gas cylinder to prevent the regulator from being adjusted again once the system is assembled.
3. By using dispensing control valve, it is possible to control the supply of fluid in the cylinder when a flow supply is required.
4. When any kind of malfunctions or failures occur at the outlet valve, the leakage of fluid from the gas cylinder can be restricted.
5. Without regulator inside a gas cylinder, the capacity in the gas cylinder can be increased.
6. It can dynamically provide the current storage pressure inside the gas cylinder, so that users can monitor the remaining volume of the fluid in the gas cylinder immediately.
7. It can eliminate the need for adsorbent materials in the gas cylinder.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
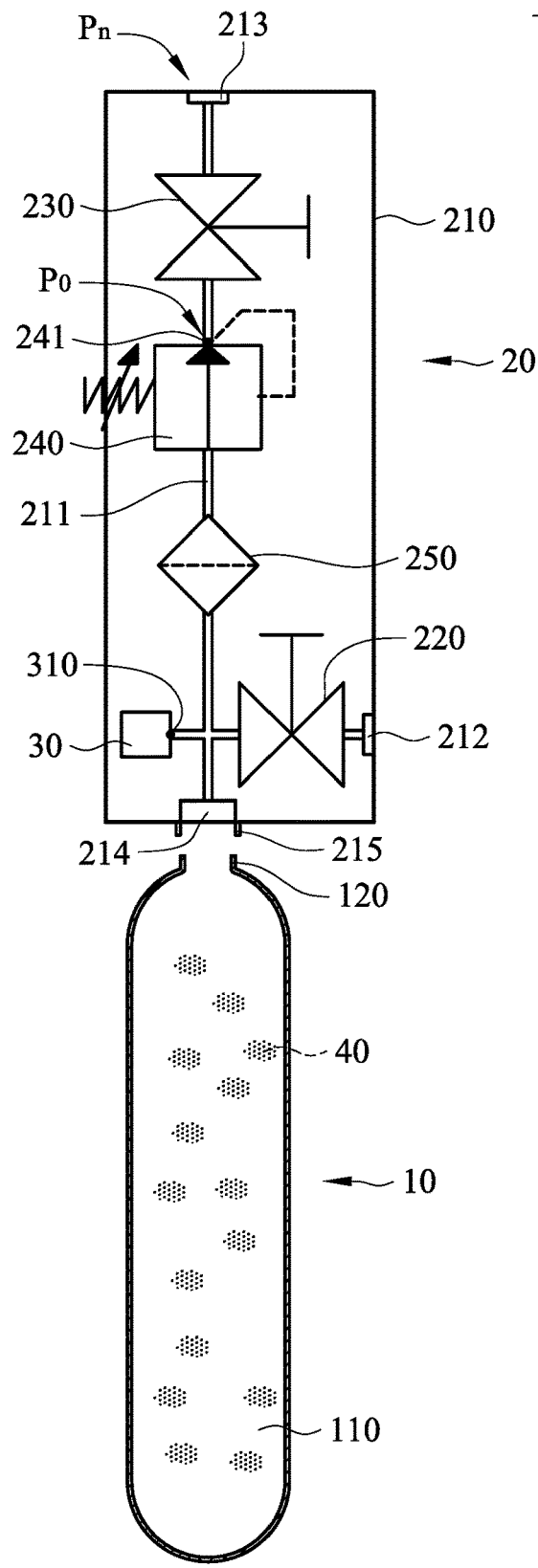
FIG. 1 is a detailed schematic representation of a leak-proof fluid dispensing system with a pressure sensor and an adjustable dispensing regulator.
Figure 2:
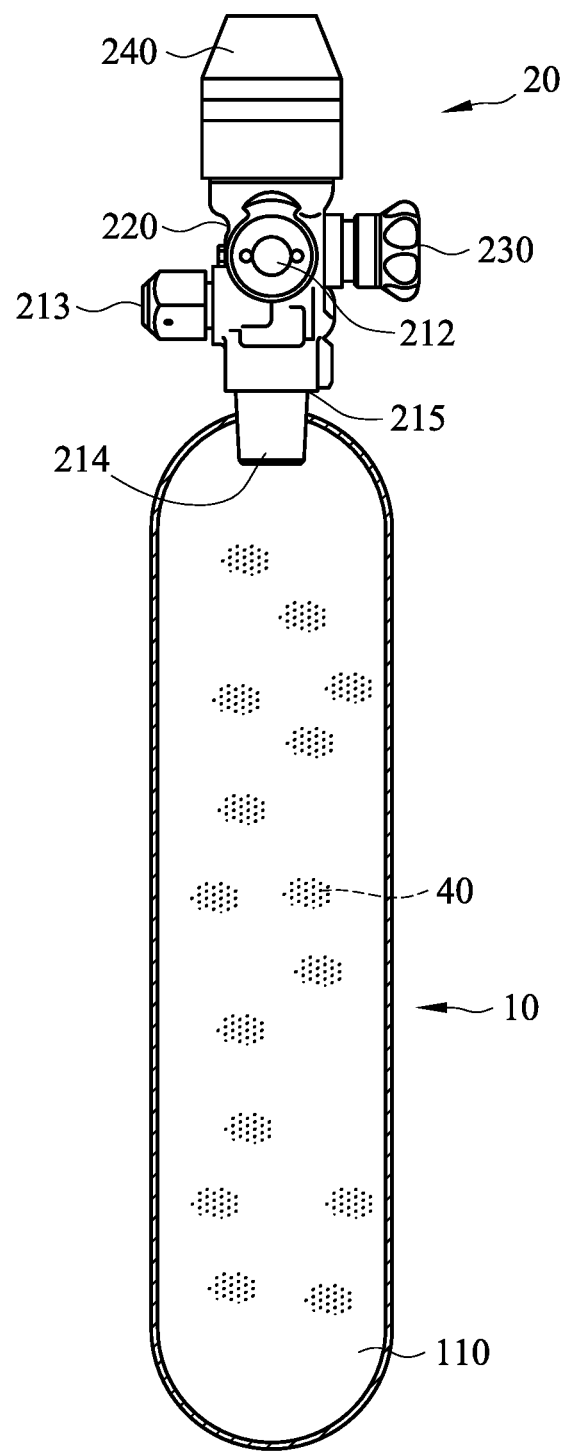
FIG. 2 is a three-dimensional schematic representation of the leak-proof fluid dispensing system.
Figure 3:
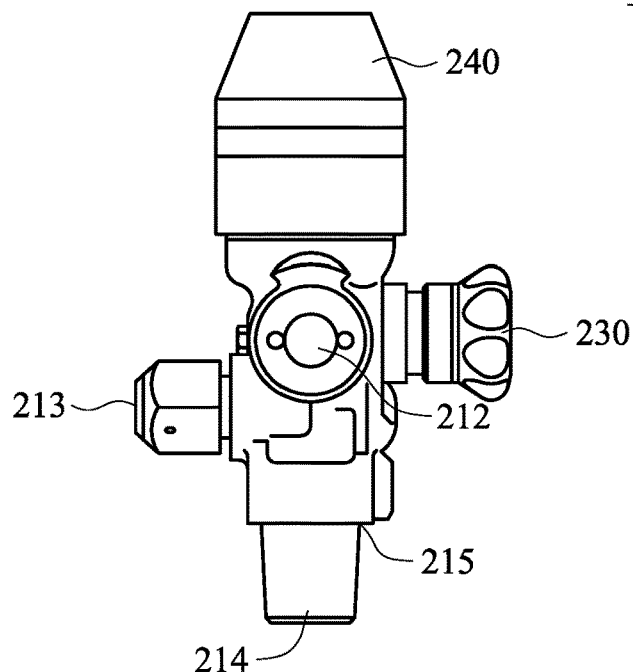
FIG. 3 is one of an embodiment diagram of the dispensing control valve.

As shown in FIG. 1 to FIG. 3, an embodiment of a leak-proof fluid dispensing system 100 having pressure sensor and adjustable dispensing regulator, comprises a gas cylinder 10; a dispensing control valve 20; a pressure sensor 30.

The gas cylinder 10 has a containing space 110 and a bottle opening 120. The containing space 110 is used to store a industrial processing fluid 40 which can be a liquid or a gas and is generally a toxic and toxic substance.

Figure 4:
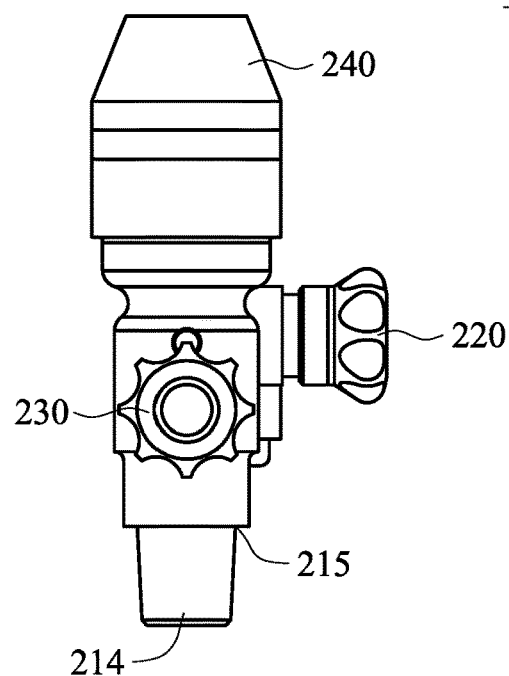
FIG. 4 is the other embodiment diagram of the dispensing control valve.

As shown in FIG. 4, the dispensing control valve 20 includes a dispensing body 210; an inlet valve 220; an outlet valve 230; a pressure dispensing regulator 240; and a filter 250.

The dispensing body 210 may be a metal structure, and the dispensing body 210 includes an internal channel 211 that communicates with an inlet port 212, an outlet port 213, a bottle port 214, and a joint portion 215.

The join portion 215, for example, a screw tooth, can be combined with the screw tooth of the bottle opening 120 through rotation, and the join portion 215 is detachably and sealed combined to the bottle opening 120. When the join portion 215 is combined to the bottle opening 120, the bottle port 214 is detachably communicated with the containing space 110, and the dispensing body 210 is formed outside the bottle opening 120.

The inlet valve 220 may be a general valve or a non-return valve that cannot exit but inlet. The inlet valve 220 is connected to the inlet port 212 and the internal channel 211 and the inlet valve 220 is used to start or stop the inflow of upstream fluid from the inlet port 212 into the dispensing control valve 20. Under some conditions, the inlet valve 220 may also bypass the pressure dispensing regulator 240 and directly draw fluid from the gas cylinder 10 through the inlet valve 220.

The inlet valve 220 may be disposed, for example, at a position 180 degrees to the outlet valve 230 and the inlet valve 220 is managed by the gas charging plants rather than the user end. The inlet valve 220 is provided with an inlet opening/closing unit which can be opened or closed only by using an inlet-valve tool. The inlet-valve tools are only set up in the gas charging plant and the user end will not have the inlet-valve tool so that the user end has absolutely no opportunity to open or close the inlet valve 220.

In addition, the inlet port 212 is provided with an inlet protection cover, apart from protecting the inlet port 212 from damaged by being hit, the inlet protection cover generally used a metal gasket to maintain the sealed connected between the protection cover and the outlet port 213, adding a leak-proof guarantee for the inlet port 212.

Furthermore, because the inlet protection cover is provided, the inlet port 212 cannot be connected to any gas charging or pumping device connectors without the inlet protection cover being removed, and it can avoid incorrect operation again.

The outlet valve 230 may be a general valve or a non-return valve that cannot enter but exit, the outlet valve 230 is connected to the outlet port 213 and the internal channel 211, the outlet valve 230 is used to start or stop the flow exiting of downstream fluid of the dispensing control valve 20.

The pressure dispensing regulator 240 is connected to the outlet port 213 and the bottle port 214 through the internal channel 211, the pressure dispensing regulator 240 can be preset an opening pressure value opening pressure value. In general, when the actual pressure at the outlet end 241 of the pressure dispensing regulator 240 is lower than or equal to the opening pressure value, then the pressure dispensing regulator 240 is being turned on and opened at this time and the fluid in the gas cylinder 10 is allowed to flow out.

Figure 5:
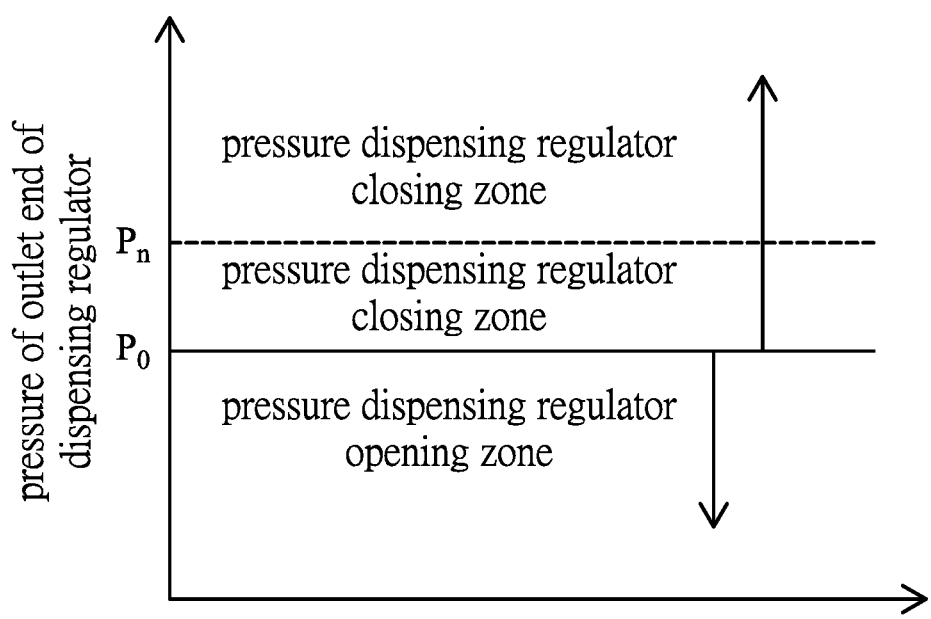
FIG. 5 is a schematic representation of the start-up state of the dispensing control valve.

As shown in FIG. 5, also under some conditions, to prevent leakage and increase safety, for example, in ion implantation applications, the opening pressure value is set or assigned as a first opening pressure value $P_0$ which is less than an atmospheric pressure. At this time, even if the outlet valve 230 is opened, but the actual pressure outside the outlet end 241 is equal to an atmospheric pressure so that the pressure dispensing regulator 240 is still closed and the fluid in the gas cylinder 10 will not flow out to prevent accidental leakage. The pressure dispensing regulator 240 will not be turned on until the outlet port 213 is connected to the user end, then the outlet port 213 is operated by the user end to create an user-end pressure value which is under an atmospheric pressure Pn and equal to or lower than the first opening pressure $P_0$ so that the fluid in the gas cylinder 10 is also allowed to flow out.

For example, the first opening pressure value $P_0$ is set as, for example, minus 0.5 psig which is lower than or equal to an atmospheric pressure Pn, 14.7 pounds per square inch (psig). When the actual pressure of the outlet port 213 is lower than or equal to the first opening pressure value $P_0$ of minus 0.5 psig because of the user end equipment, the pressure dispensing regulator 240 allows the fluid in the gas cylinder 10 to flow out through its outlet end.

Due to the above-mentioned mechanism, during the storage or transportation of the gas cylinder 10, because the gas cylinder 10 is always in an atmospheric pressure Pn 14.7 psig, the pressure of outlet port 213 has not been reached the first opening pressure value $P_0$, therefore, even if the outlet valve 230 is damaged or accidentally opened, there is no possibility that the fluid in the gas cylinder 10 leaks out.

Regarding the pressure dispensing regulator 240 described above, the setting of the opening pressure value is set to the pressure required for the operation of the downstream user's equipment. In order to prevent the fluid in the gas cylinder 10 from accidentally leaking from the outlet port 213, during the usual storage or transportation process, the outlet port 213 can be covered with the outlet protection cover again until the user end is ready to get the supply connection.

The filter 250 is connected to the pressure dispensing regulator 240 and the bottle port 214 through the internal channel 211. Since the pressure dispensing regulator 240 is a very delicate and sensitive unit, when the particle intrusion into the pressure dispensing regulator 240, it will make the pressure dispensing regulator 240 ineffective. Therefore, in order to protect the pressure dispensing regulator 240, a filter 250 may be provided at the intake end of the pressure dispensing regulator 240, which is connected to the pressure dispensing regulator 240 and the bottle port 214 through the internal channel, to filter the particles.

The pressure sensor 30 may be disposed on the dispensing body 210 in some cases where the fluid capacity in the gas cylinder 10 needs dynamically monitoring. A detection end 310 of the pressure sensor 30 is pressure-sensitively connected to the internal channel 211 which is between the filter 250 and the bottle port 214, thereby dynamically monitoring the volume of fluid in the gas cylinder 10. In this way, the preparation of the new gas cylinder 10 can be performed in advance, so as to avoid the production line being stopped and the loss caused because the process fluid cannot be smoothly supplied.

Figure 6:
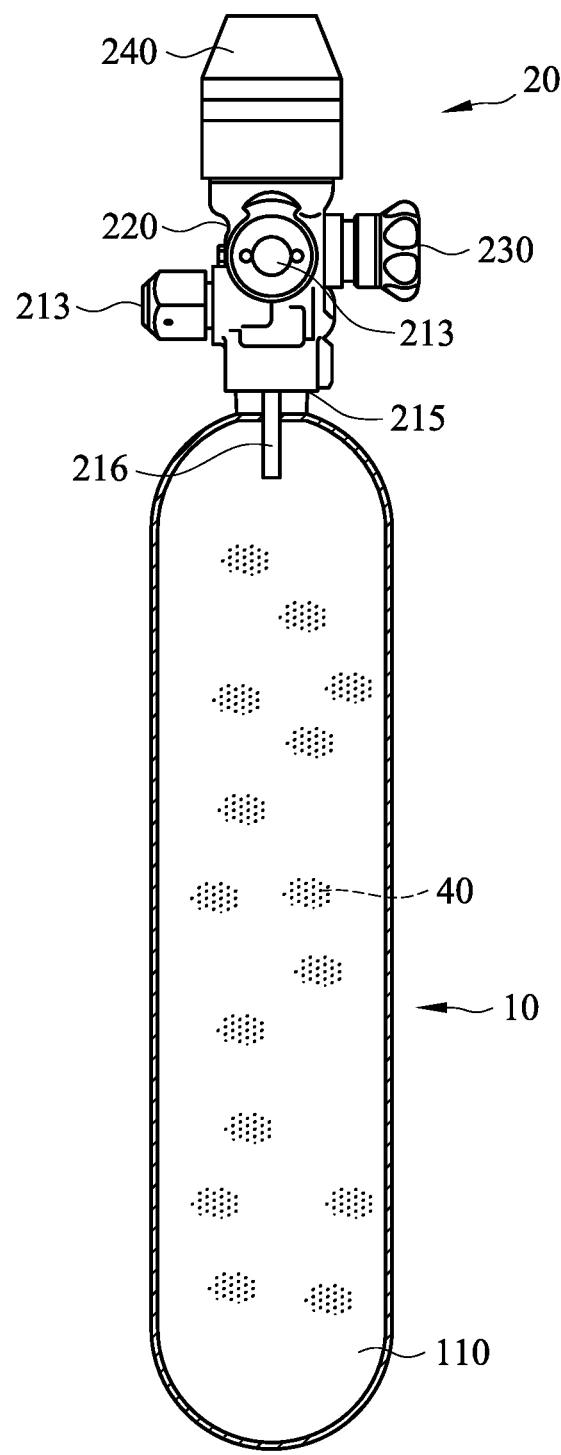
FIG. 6 is a schematic representation of the bottle port provided with a restrictive flow orifice.

As shown in FIG. 6, in some cases, in order to prevent the gas or liquid in the gas cylinder 10 from being released quickly or in large quantities, a restrictive flow orifice 216 may be further provided and connected to the bottle port 214 so that the fluid in the gas cylinder 10 can be released slowly.

Next, one of the embodiments is used for operation description.

Preparation before charging operation: When the gas cylinder 10 is used by the user, the gas cylinder 10 will be transported to the charging plant and gas charging will be operated again. After the gas cylinder 10 delivered to the charging plant, it must be used the key only available in the charging plant to remove the inlet protective cover before the charging operation to connect the charging device to the inlet port 212.

The inlet-valve tool, which is only available in charging plant, must be used to open the inlet valve 220 before the charging operation can be performed. Before the charging operation, the opening pressure value of the pressure dispensing regulator 240 has been preset to minus 0.5 psig.

Charging operation: The gas cylinder 10 will be filled by the inflation equipment of the charging plant until the pressure of the contents of the gas cylinder 10 is about 1,500 psig.

Pumping operation: In some cases, when the gas cylinder 10 must be pumped from the inlet port 212, similarly, before extracting air, it is also necessary to use a key only available in the charging plant to remove the inlet protective cover, then connect the discharging equipment to the inlet port 212. Finally, use the inlet valve tool only available in the discharging plant to open the inlet valve 220, then the pumping operation can be performed.

Storage or transportation of the gas cylinder 10: after charging or pumping is completed, the inlet-valve tool must be used again to close the inlet valve 220, then the gas port protective cover must be closed and locked again before the storage or transportation of the gas cylinder 10. Since the opening pressure value of the pressure dispensing regulator 240 has been preset to minus 0.5 psig the gas cylinder 10 is in an atmospheric pressure during the storage or transportation. Because the opening pressure value of the pressure dispensing regulator 240 is less than minus 0.5 psig, it can be ensure that the internal fluid of the gas cylinder 10 will not leak even if the outlet valve 230 is damaged or accidentally opened.

Preparation of gas cylinder 10 before use: After the gas cylinder 10 is delivered to the user end, the outlet protective cover of the gas cylinder 10 will be removed, and then the outlet port 213 of the gas cylinder 10 will be connected with the equipment at the user's end.

User operation: After the gas cylinder 10 is connected to the user end device, the outlet valve 230 can be opened. At this time, the outlet of the pressure dispensing regulator 240 will detect the device pressure value of the user end, if it is less than or equal to, for example, minus 2.1 psig, because the minus 2.1 psig is less than 0.5 psig, the first opening pressure value $P_0$ of the pressure dispensing regulator 240 so that the pressure dispensing regulator 240 will be turned on and the fluid in the gas cylinder 10 is supplied to the user equipment.

The above description is only the preferred embodiments of the present invention and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. A leak-proof fluid dispensing system with a pressure sensor and a dispensing control valve, comprising:
    a gas cylinder having a containing space and a bottle opening;
    the dispensing control valve including:
        a dispensing body having an internal channel that communicates with an inlet port, an outlet port, a bottle port, and a joint portion, wherein the joint portion is detachably sealed and combined with the bottle opening, the bottle port is detachably communicated with the containing space, and the dispensing body is formed outside of the bottle opening, and wherein the dispensing body includes therein:
            an inlet valve connected to the inlet port and the internal channel;
            an outlet valve connected to the outlet port and the internal channel;
            a pressure dispensing regulator connected to the outlet port and the bottle port through the internal channel and preset with an opening pressure value; and
            a filter connected to the pressure dispensing regulator and the bottle port through the internal channel; and
        the pressure sensor disposed inside of the dispensing body and having a detection end, the detection end is pressure-sensitively connected to the internal channel between the filter and the bottle port;
    wherein the inlet valve, the outlet valve, the pressure dispensing regulator, and the filter are disposed inside of the dispensing body;
    wherein the opening pressure value is assigned as a first opening pressure value which is set lower than an atmospheric pressure, when an actual pressure at an outlet end of the pressure dispensing regulator is lower than or equal to the first opening pressure value, the pressure dispensing regulator is opened;
    wherein the bottle port is further connected to a restrictive flow orifice, the restrictive flow orifice allowing fluid in the gas cylinder to be released slowly; and
    wherein even if the outlet valve is opened, but the actual pressure outside the outlet end of the pressure dispensing regulator is equal to the atmospheric pressure, the pressure dispensing regulator is still closed and fluid in the gas cylinder will not flow out to prevent accidental leakage.

2. A dispensing control valve structure with a pressure sensor, adapted to be connected to a gas cylinder having a containing space and a bottle opening, the dispensing control valve structure comprising:
    a dispensing body having an internal channel that communicates with an inlet port, an outlet port, a bottle port, and a joint portion, wherein the joint portion is detachably sealed and combined with the bottle opening, the bottle port is detachably communicated with the containing space, and the dispensing body is formed outside of the bottle opening, wherein the dispensing body includes therein:
        an inlet valve connected to the inlet port and the internal channel;
        an outlet valve connected to the outlet port and the internal channel;
        a pressure dispensing regulator connected to the outlet port and the bottle port through the internal channel and preset with an opening pressure value; and
        a filter connected to the pressure dispensing regulator and the bottle port through the internal channel; and
        the pressure sensor disposed inside of the dispensing body and having a detection end, the detection end is connected to the internal channel between the filter and the bottle port;
    wherein the inlet valve, the outlet valve, the pressure dispensing regulator, and the filter are disposed inside of the dispensing body;
    wherein the opening pressure value is assigned as a first opening pressure value which is set lower than an atmospheric pressure, when an actual pressure at an outlet end of the pressure dispensing regulator is lower than or equal to the first opening pressure value, the pressure dispensing regulator is opened;
    wherein the bottle port is further connected to a restrictive flow orifice, the restrictive flow orifice allowing fluid in the gas cylinder to be released slowly; and
    wherein even if the outlet valve is opened, but the actual pressure outside the outlet end of the pressure dispensing regulator is equal to the atmospheric pressure, the pressure dispensing regulator is still closed and fluid in the gas cylinder will not flow out to prevent accidental leakage.

3. A dispensing control valve structure, adapted to be connected to a gas cylinder having a containing space and a bottle opening, the dispensing control valve structure comprising:
    a dispensing body having an internal channel that communicates with an inlet port, an outlet port, a bottle port, and a joint portion, wherein the joint portion is detachably sealed and combined with the bottle opening, the bottle port is detachably communicated with the containing space, and the dispensing body is formed outside of the bottle opening, wherein the dispensing body includes therein:
        an inlet valve connected to the inlet port and the internal channel;
        an outlet valve connected to the outlet port and the internal channel;
        a pressure dispensing regulator connected to the outlet port and the bottle port through the internal channel and preset with an opening pressure value; and
        a filter connected to the pressure dispensing regulator and the bottle port through the internal channel;
    wherein the inlet valve, the outlet valve, the pressure dispensing regulator, and the filter are disposed inside of the dispensing body;

wherein the opening pressure value is assigned as a first opening pressure value which is set lower than an atmospheric pressure, when an actual pressure at an outlet end of the pressure dispensing regulator is lower than or equal to the first opening pressure value, the pressure dispensing regulator is opened;

wherein the bottle port is further connected to a restrictive flow orifice, the restrictive flow orifice allowing fluid in the gas cylinder to be released slowly; and wherein even if the outlet valve is opened, but the actual pressure outside the outlet end of the pressure dispensing regulator is equal to the atmospheric pressure, the pressure dispensing regulator is still closed and fluid in the gas cylinder will not flow out to prevent accidental leakage.

* * * * *